United States Patent [19]

Shurter

[11] Patent Number: 5,147,711
[45] Date of Patent: Sep. 15, 1992

[54] VACUUM BARRIER FOR EXCIMER LASERS

[75] Inventor: Roger P. Shurter, Jemez Springs, N. Mex.

[73] Assignee: The United States of America as represented by the United States Department of Energy, Washington, D.C.

[21] Appl. No.: 596,154

[22] Filed: Oct. 10, 1990

[51] Int. Cl.$^5$ .................. B32B 27/06; B32B 15/08; H01S 3/22
[52] U.S. Cl. .................. 428/216; 428/252; 428/473.5; 428/458; 428/408; 372/57
[58] Field of Search .............. 428/216, 252, 263, 265, 428/285, 372, 473.5, 458; 372/57

[56] References Cited

U.S. PATENT DOCUMENTS 4,992,323 2/1991 Vogelesang et al. ............ 428/458

OTHER PUBLICATIONS

Shurter et al., "Performance Improvements with Advanced Design Foils in High-Current Electron Beam Diodes", LA-UR 90-1020, Jun. 11, 1989.
R. G. Anderson, R. P. Shurter, E. A. Rose, "Qualification of Diode Foil Materials for Excimer Lasers," Dec. 11, 1989.

Primary Examiner—George F. Lesmes
Assistant Examiner—Kathryne E. Shelborne
Attorney, Agent, or Firm—Milton D. Wyrick; Paul D. Gaetjens; William R. Moser

[57] ABSTRACT

A barrier for separating the vacuum area of a diode from the pressurized gas area of an excimer laser. The barrier is a composite material comprising layers of a metal such as copper, along with layers of polyimide, and a matrix of graphite fiber yarns impregnated with epoxy. The barrier is stronger than conventional foil barriers, and allows greater electron throughput.

7 Claims, 2 Drawing Sheets

VACUUM BARRIER FOR EXCIMER LASERS

The invention is a result of a contract with the Department of Energy (Contract No. W-7405-ENG-36).

BACKGROUND OF THE INVENTION

The present invention relates to the field of electron-beam diodes, and, more specifically, to vacuum/pressure barriers located between the vacuum environment surrounding the beam generation means and the gaseous environment into which the beam is directed in an excimer laser.

Current technology for handling the transition of an electron beam from its genesis to the adjacent gaseous environment in an excimer laser presents many limitations on the efficiency of a vacuum diode. This is primarily because of the different environments required for the vacuum diode and the adjoining laser gas cavity. While a vacuum is required for the diode, the environment of the laser cavity is typically at a pressure of 600–900 Torr.

Supported metal foils, commonly of titanium, have been widely used to provide this separation of environments, but often serve to attenuate the beam, scatter the beam's particles, or become hot due to the beam. These foils require massive support structures, known as Hibachis, which themselves intercept and greatly attenuate the beam. It is common for beam losses due to impingement by the electrons on the hibachi and attenuation by the metal foil to be as high as 60–70%.

Hibachis often cast shadows which are substantially larger than their cross sectional areas. This is because the electron beam is seldom normally incident due to the effects of the self-field generated by the beam. This can be a particularly serious problem for large amplifiers where the electron beam may have an area of several square meters.

In searching for a barrier to replace metal foils, it is important to recognize the requisite properties for use in an excimer laser system. The large difference in pressure between the vacuum of the diode and the laser cavity containing the corrosive gas challenges any barrier material. Therefore, the barrier must have high tensile strength and a high elastic modulus. It additionally must allow for high electron transmission, and have low ultraviolet reflectively. It must also be chemically compatible with fluorine or other reactive gasses.

Recent years have seen great advances in the development of ultra high strength, low-Z filaments, principally made of boron and carbon. These materials make possible the creation of an excellent replacement for the metal foil barriers of the past. The present invention uses such filaments formed into a matrix and sandwiched between layers of solid material to form a composite foil. Having strength greater than that of metal foils, the present invention allows use of support structures with ribs much more widely separated than with metal foils, and, in some cases, even allows for a completely self-supporting barrier.

Testing has revealed that barriers according to the present invention allow approximately 85% of available electrons to enter the gaseous region of an excimer laser. This compares very favorably with the approximately 35%–40% efficiency of prior hibachi supported foil barriers.

It is therefore an object of the present invention to provide a vacuum barrier which will permit greater electron through put than previous barriers.

It is another object of the present invention to provide a vacuum barrier which requires less supporting structure than previous barriers.

SUMMARY OF THE INVENTION

To achieve the foregoing and other objects, and in accordance with the purposes of the present invention, as embodied and broadly described herein, the apparatus of this invention comprises a composite foil barrier for separating a vacuum region from a high pressure gaseous region in an excimer laser, while not significantly attenuating an electron beam passing therethrough comprising a first thin layer of metal with a first thin layer of polyimide overlying the first thin layer of metal. A second thin layer of metal overlies the first thin layer of polyimide. Carbon fibers are formed into a plurality of carbon fiber tapes, which are in turn formed into a matrix overlying said thin layer of metal. A second thin layer of polyimide overlies the carbon fiber tapes. The first thin layer of metal is adjacent to the pressurized gaseous region, and the second thin layer of polyimide is adjacent to the vacuum region of the excimer laser.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention provides an effective interface barrier between areas of widely different pressures, as occurs between the vacuum in the diode and the gas in the laser cavity of an electron-beam pumped excimer laser. The application of the barrier is best understood through reference to FIG. 1, wherein a schematic representation of a diode in an excimer laser amplifier is illustrated.

Figure 1:
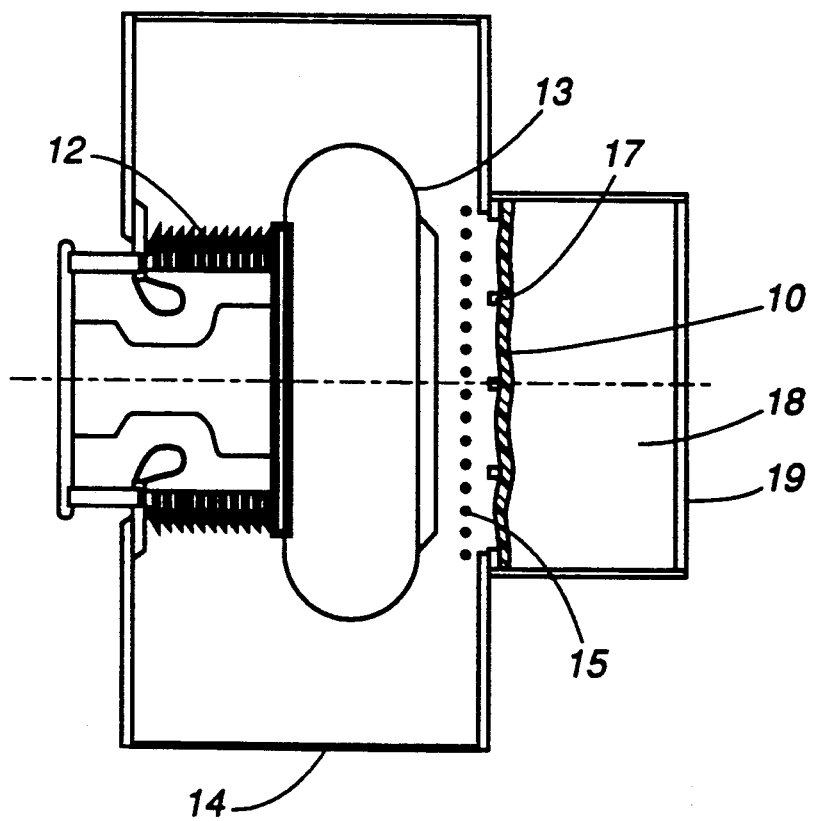
FIG. 1 is a schematic representation of a typical vacuum diode used in an excimer laser amplifier.

In FIG. 1, high voltage bushing 12 and cathode 13 are shown inside evacuated enclosure 14. Anode 15 is spaced apart a short distance from cathode 13. Barrier 10, such as is provided by the present invention, is supported by ribs 17 of an hibachi. Barrier 10 separates the vacuum in enclosure 14 from the pressurized laser gas 18 in enclosure 19. Prior art barriers, typically comprising titanium foils, lack strength and require hibachis with small openings and many ribs 17.

Figure 2:
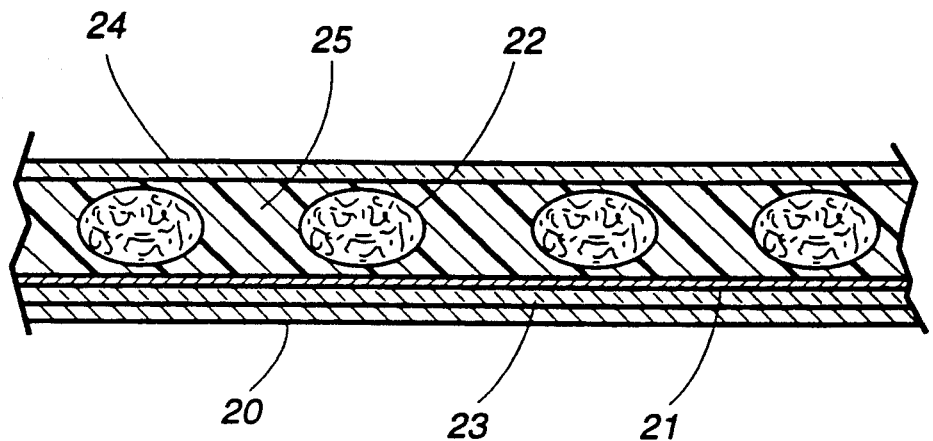
FIG. 2 is a cross-sectional view of an embodiment of the composite foil according to the present invention with all layers oversized for clarity.

One embodiment of a barrier according to the present invention is illustrated in an enlarged cross-sectional view in FIG. 2. Here, barrier 10 is shown comprising five layers of material.

It is important to note that the actual composition of barriers according to the present invention can be varied to accommodate the specific requirements of a particular amplifier. The area of the electron beam output aperture will largely determine the exact composition of the present invention for each application. The important criteria are the required modulus of elasticity and tensile strength.

As shown, for one embodiment particularly useful for small apertures, or with some degree of support from a hibachi in larger apertures, first metallic layer 20 is approximately 2000–4000 Angstroms mil thick, and has approximately 1.0 mil thick polyimide layer 23 applied over it. Next, second metallic layer 21 is applied over polyimide layer 23, and is approximately 2000–4000 Angstroms thick. Next comes a fairly open interwoven matrix of graphite fiber yarn 22 for strength. Finally polyimide (Kapton ®) layer 24 is applied over graphite fiber yarn 22. at a thickness of approximately 1 mil.

Graphite fiber yarn 22 is a woven carbon fiber yarn comprised of 500–2000 individual carbon filaments which have been woven together in machines suitable for the purpose. Such carbon fiber yarns are generally commercially available from numerous commercial sources.

Graphite fiber yarn 22 is impregnated with epoxy resin filler 25, such as an epoxy and an aromatic amine curing agent, which fills the space between graphite fiber yarn 22 and between polyimide layer 24 and second metallic layer 21 in FIG. 1, by running the yarn through an epoxy bath. Alternatively, the epoxy resin filler 25 could be forced into the filaments by pressure. After impregnation, graphite fiber yarn 22 must be kept cool to prevent premature curing of epoxy 25. After all layers are in place, barrier 10 is placed onto a heated platten press (not shown) with release layers of Teflon ® on both sides of the press. Pressure and heat are applied to barrier 10 until epoxy resin filler 25, which acts as both a filler and a bonding agent, is cured. The aromatic amine curing agent provides for higher radiation tolerance.

First metallic layer 20 and second metallic layer 21 are comprised of a metal which will not react with a gaseous environment of fluorine, and which can be deposited by vapor deposition. Additionally, the metal must have low reflectivity at the frequency of light output from the particular excimer laser. This frequency is 248 nm for the light output from a KrF excimer laser. Low reflectivity is required to minimize losses in output power due to amplified spontaneous emission (A.S.E.) within the laser cavity.

Testing has demonstrated that copper and Inconel ® are excellent materials for metallic layers 20, 21. Other materials, such as samarium or a copper samarium compound, which are compatible with fluorine, and have low reflectivity at 248 nm, may also be suitable for metallic layer 20, which is in direct contact with the laser gas. Copper is especially good as metallic layer 20, as it has naturally has low reflectivity at 248 nm, the frequency of light from a KrF excimer laser, which is improved even more by a layer of copper oxide which forms on the surface of metallic layer 20 after a period of exposure to the fluorine environment. Aluminum has been shown to be a suitable alternate as metallic layer 21, which is not in direct contact with the laser gas.

Titanium, which has been used in previous vacuum barriers, is not as effective as copper or Inconel ® for metallic layer 20 because it forms harmful compounds which poison the laser gas, limiting the laser amplifier gain and damaging the coatings on the laser optics.

The thickness of metallic layers 20, 21 is not overly important. It is necessary, however, that the layers be thick enough to prevent gas permeation. Testing has indicated that a thickness of approximately 2000–4000 Angstroms performs satisfactorily.

Where greater strength is necessary for a particular application, the number of graphite fiber yarns 22 can be increased. A higher density of graphite fiber yarn 22 can also be applied about the periphery of barrier 10 to provide high structural integrity in the area of attachment to the aperture (not shown). Also additional layers of polyimide and metal can be applied if required.

Figure 3:
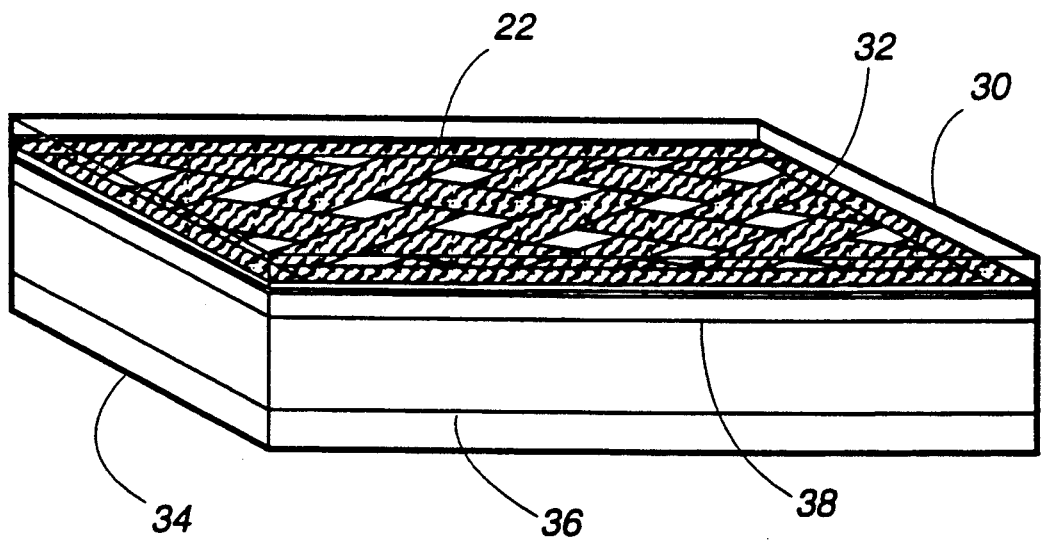
FIG. 3 is a perspective view of an embodiment of the invention useful for spanning large openings.

Such an embodiment capable of spanning larger apertures is illustrated in a perspective cross-section in FIG. 3. Here, a large number of graphite fiber yarns 22 are shown in a matrix covering a high percentage of the total surface area of barrier 10. In this embodiment, the cross-section reveals layer of copper 34, approximately 2000 Angstroms thick, under polyimide layer 36 which is approximately 1 mil thick. Next is another 2000 Angstrom layer of copper 38, covered by graphite fiber yarn 22 and another 1 mil thick polyimide layer 30.

Also shown in FIG. 4 are additional graphite fiber yarns 32 aligned along the periphery of barrier 10. This provides additional edge strength for large aperture barriers. It should be noted that the layers of barrier 10 are primarily held together by epoxy resin impregnated into graphite fiber yarns 22.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A vacuum barrier for separating a region of vacuum from a pressurized gaseous region in an excimer laser, said barrier comprising:
   a first thin layer of metal having a thickness in the range of 2000–4000 Angstroms;
   a first thin layer of polyimide having a thickness of approximately 1 mil overlying said first thin layer of metal;
   a second thin layer of metal having a thickness in the range of 2000–4000 Angstroms overlying said first thin layer of polyimide;
   carbon fibers formed into a plurality of graphite fiber yarns, said graphite fiber yarns comprising 500–2000 carbon fibers and being formed into a matrix overlying said second thin layer of metal; and
   a second thin layer of polyimide having a thickness of approximately 1 mil overlying said carbon fiber tapes;
   wherein said first thin layer of metal is adjacent to said pressurized gaseous region, and said second thin layer of polyimide is adjacent to said region of vacuum.

2. The vacuum barrier as described in claim 1, wherein said first and second thin layers of metal comprise thin layers of copper.

3. The vacuum barrier as described in claim 1, wherein said first thin layer of metal comprises a thin layer of samarium.

4. The vacuum barrier as described in claim 1, wherein said first thin layer of metal comprises a thin layer of Inconel ®.

5. The vacuum barrier as described in claim 1, wherein said second thin layer of metal comprises aluminum.

6. The vacuum barrier as described in claim 1, wherein said graphite fiber yarns are impregnated with an epoxy and an aromatic amine curing agent.

7. The vacuum barrier as described in claim 1, further comprising graphite yarn positioned about the periphery of said barrier.

* * * * *